(No Model.)　　　　　　　　　　　　　　　　　　　2 Sheets—Sheet 1.
C. H. ROBISON.
CHURN.
No. 338,786.　　　　　　　　　　　　Patented Mar. 30, 1886.
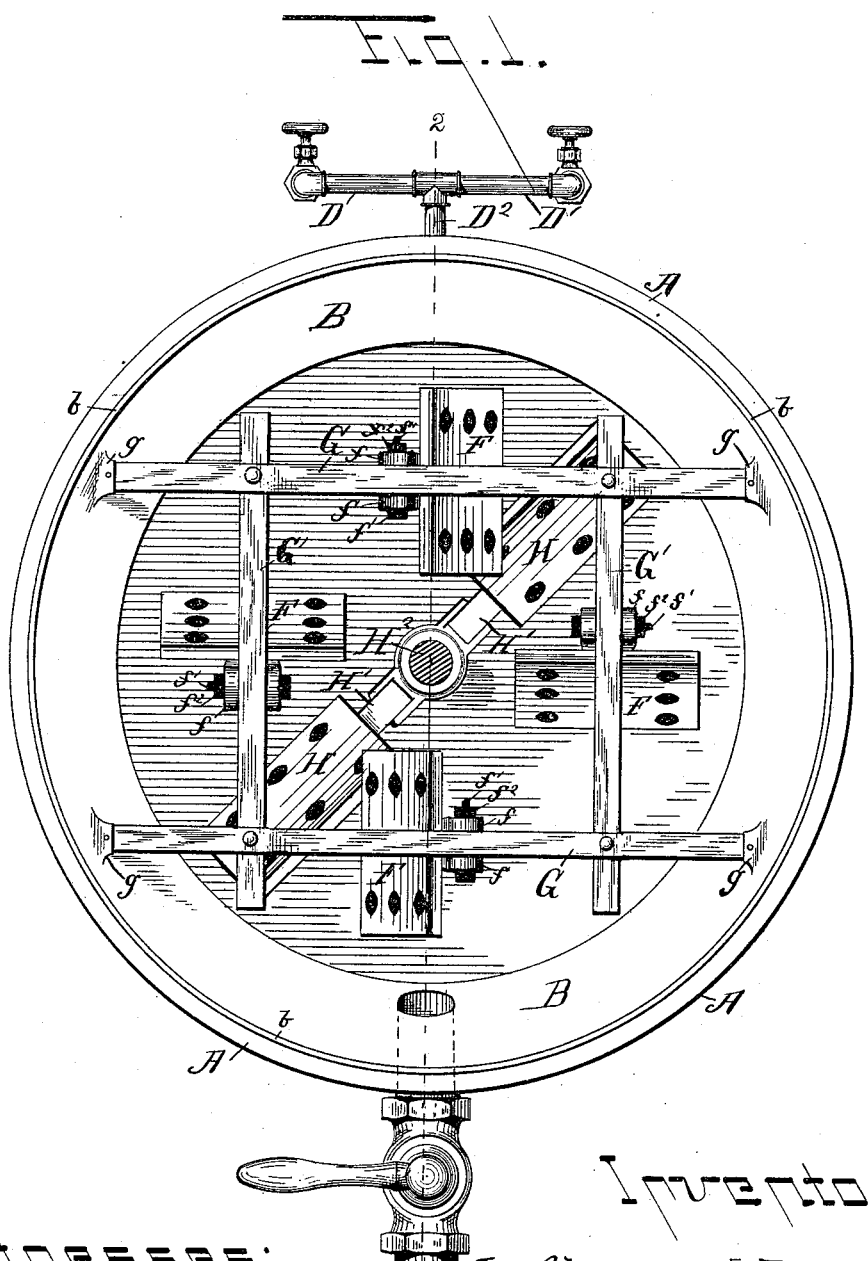
Witnesses:
Chas. L. Carman
Taylor E. Brown
Inventor:
Charles H. Robison,
per Munday, Evarts & Adcock
his Attorneys.

(No Model.) 2 Sheets—Sheet 2.
C. H. ROBISON.
CHURN.
No. 338,786. Patented Mar. 30, 1886.
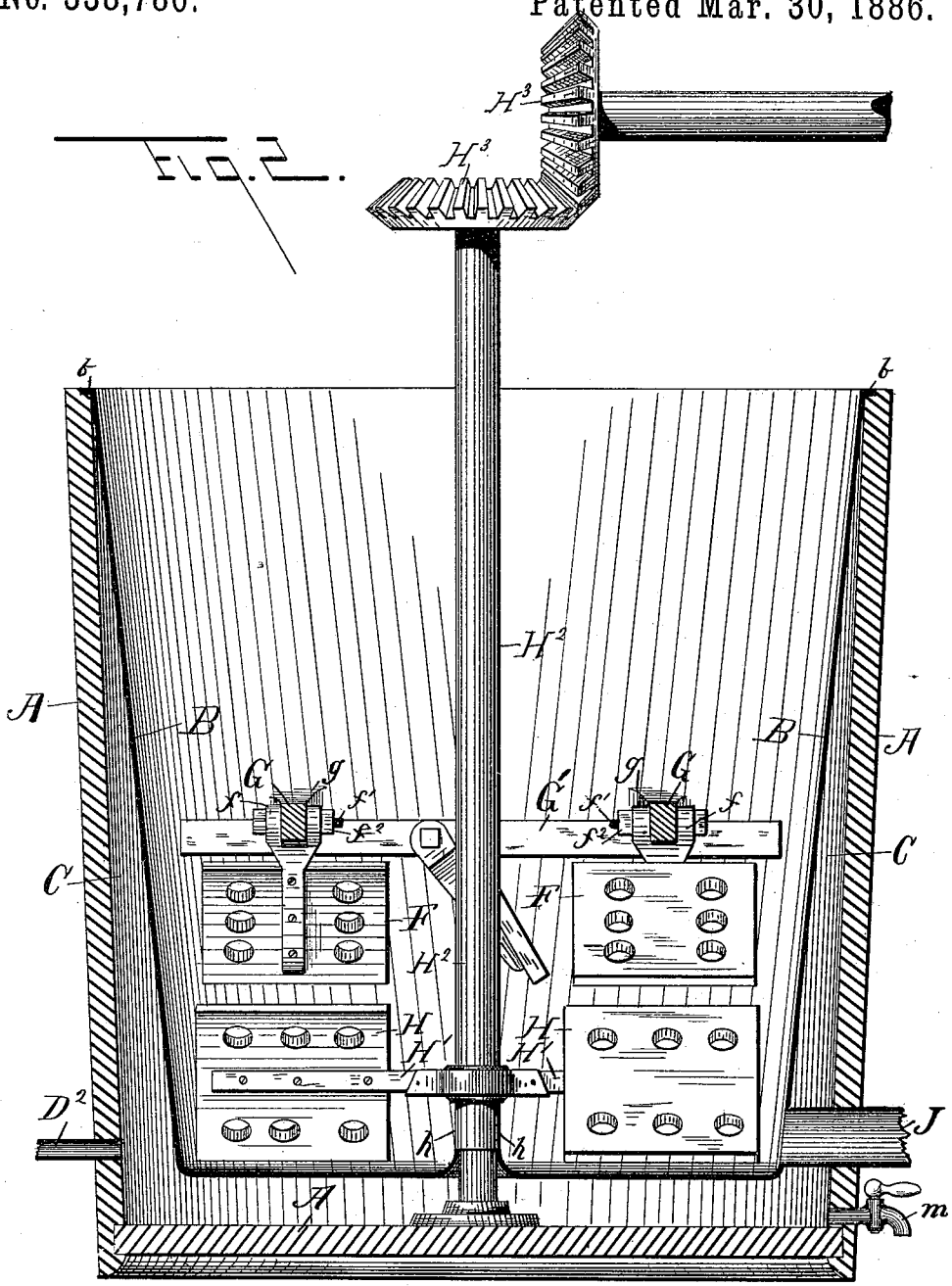
Witnesses:
Chas. L. Carman.
Taylor E. Brown
Inventor:
Charles H. Robison
per Munday, Evarts & Adcock
his Attorneys.

UNITED STATES PATENT OFFICE.

CHARLES H. ROBISON, OF MAYWOOD, ILLINOIS.

CHURN.

SPECIFICATION forming part of Letters Patent No. 338,786, dated March 30, 1886.

Application filed December 10, 1884. Serial No. 149,946. (No model.)

*To all whom it may concern:*

Be it known that I, CHARLES H. ROBISON, a citizen of the United States, residing at Maywood, in the county of Cook and State of Illinois, have invented a new and useful Improvement in Churns, of which the following is a specification.

The object of the present invention is to provide a simple and efficient device for churning butter in large quantities, and one whereby the temperature of the cream or material being churned may be regulated or maintained at the proper degree during the various stages of the operation, whereby the time and labor required in the process may not only be greatly lessened, but the quality of the product very much improved.

The invention is specially designed for the churning of butterine, in the manufacture of which the maintaining of a proper temperature is of even greater importance than in churning ordinary butter; and to this end I make the vessel which contains the material to be churned of galvanized sheet-iron or other metal capable of conducting heat readily, and surround the same with an outer vessel, leaving a chamber between the two, which I fill with hot or cold water or steam, as occasion may require, whereby I am enabled to keep the temperature of the material being churned under complete control at all times.

The invention consists in an inner vessel provided with a series of stationary splashers or paddles, hinged or pivoted to their supports, so that they may be adjusted to any desired inclination, in connection with one or more rotary splashers or paddles arranged below the former and at an inclination, so that the revolution of the latter will tend to throw or beat the material being churned up against the former.

In the accompanying drawings, which form a part of this specification, and in which similar letters of reference indicate like parts, Figure 1 is a plan view of a device embodying my invention, and Fig. 2 is a central vertical section on line 2 2 of Fig. 1.

In said drawings, A represents the outer tub or vessel, preferably made of wood; and B, the inner vessel, which contains the material to be churned. The vessel B, I prefer to make of galvanized sheet-iron, and it is provided with a horizontally-projecting flange, $b$, which fits over the inner edge of the vessel A, and forms the means whereby the vessel B is supported. The inner vessel, B, is somewhat smaller than the outer vessel, so as to leave a chamber, C, between the two both at the sides and bottom. A cold-water pipe, D, and a hot-water or steam pipe, D', lead into this chamber C through a common pipe, $D^2$, whereby either hot or cold water or steam, or a mixture of them, may be supplied to the hollow chamber, as occasion may require, to regulate the temperature of the vessel B and its contents.

F represents stationary splashers, which are provided with a hinge, $f$, at their upper edges, by which they are attached to supporting-bars G and G'. The bars G are fitted at each end in sockets $g$, soldered or otherwise rigidly secured to the sides of the vessel B, while the bars G' may be secured to or supported from the said bars G. The hinge-bolts $f'$ are provided with threaded nuts $f^2$, whereby the hinge-jaws $f$ may be made to tightly clamp the supporting-bars, and thus fix the stationary splashers at any desired inclination.

The rotary splashers H are secured to the horizontal revolving arms H', supported upon the vertical shaft $H^2$, receiving motion through the miter-gears $H^3$ from any source of power. This shaft I prefer to extend through the bottom of the inner vessel, B, so it may be supported by the outer vessel, A, as shown, providing a stuffing-box or other tight joint at $h$ is used; but this is a mere matter of construction, as to which I do not wish to be limited, as it is obvious the shaft may be otherwise supported. The splashers H are held at an incline, whereby they tend to lift or throw the material against the stationary splashers F.

J represents the pipe for drawing off the liquid contents of the inner vessel or churn proper, and both it and the water or steam pipes are provided with suitable valves, as indicated.

To adapt the churn to operate upon large quantities of butter-making materials, I make it stationary, with the pipes shown permanently connected. To this end, also, the inner vessel is permanently placed in the outer one A suitable cock, m, may be also used to empty the outer vessel or draw therefrom when a change of temperature is desired.

I claim—

In a churn, the rotary splashers and the operating-shaft, in combination with the stationary splashers, bars G G', and hinges $f\, f'\, f^2$, substantially as specified.

CHARLES H. ROBISON.

Witnesses:
H. M. MUNDAY,
EDMUND ADCOCK.